(12) United States Patent
Reiners et al.

(10) Patent No.: US 10,124,837 B2
(45) Date of Patent: Nov. 13, 2018

(54) INTEGRATED TAILGATE STAKE POCKET

(71) Applicant: Ford Global Technologies, LLC, Dearborn, MI (US)

(72) Inventors: Robert Reiners, Grosse Ile, MI (US); Jack Marchlewski, Saline, MI (US); Joshua R. Hemphill, White Lake, MI (US); Michael William Danyo, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 15/258,023

(22) Filed: Sep. 7, 2016

(65) Prior Publication Data

US 2018/0065689 A1    Mar. 8, 2018

(51) Int. Cl.
  *B62D 33/03* (2006.01)
  *B62D 33/027* (2006.01)
  *B60R 3/00* (2006.01)

(52) U.S. Cl.
  CPC .............. *B62D 33/03* (2013.01); *B60R 3/007* (2013.01); *B62D 33/0273* (2013.01)

(58) Field of Classification Search
  CPC ...... B62D 33/0273; B62D 33/03; B60R 3/007
  USPC ........................................................ 296/57.1
  See application file for complete search history.

(56) References Cited

U.S. PATENT DOCUMENTS

| | | | |
|---|---|---|---|
| 6,390,744 B1 | 5/2002 | Parkins | |
| 6,918,624 B2 | 7/2005 | Miller et al. | |
| 7,070,222 B2 | 7/2006 | Bruford et al. | |
| 7,261,357 B1 * | 8/2007 | Bechen | B60R 3/02 |
| | | | 296/57.1 |
| 7,472,938 B2 | 1/2009 | Firzlaff et al. | |
| 8,919,853 B2 | 12/2014 | Krishnan et al. | |
| 9,145,176 B1 | 9/2015 | Van Wyk et al. | |
| 2006/0261585 A1 | 11/2006 | Cole | |
| 2011/0215608 A1 * | 9/2011 | Jackson | B62D 33/08 |
| | | | 296/26.11 |
| 2014/0319298 A1 | 10/2014 | O'Regan et al. | |
| 2015/0375802 A1 | 12/2015 | Courtright et al. | |
| 2015/0375804 A1 | 12/2015 | Gray et al. | |

\* cited by examiner

*Primary Examiner* — Joseph D. Pape
*Assistant Examiner* — Dana D Ivey
(74) *Attorney, Agent, or Firm* — Brooks Kushman P.C.

(57) ABSTRACT

A tailgate pivotally mountable to a vehicle includes a tailgate body comprising first and second sidewalls, and a strainer disposed between the first and second walls and extending in a longitudinal orientation. The tailgate further includes a stake pocket disposed between the first and second sidewalls and extending substantially orthogonal to the strainer. The stake pocket includes a channel body defining an interior channel.

13 Claims, 5 Drawing Sheets

INTEGRATED TAILGATE STAKE POCKET

TECHNICAL FIELD

This disclosure relates to a tailgate for a pickup truck and, more particularly, to a tailgate having tailgate stake pockets for receiving accessory devices.

BACKGROUND

Conventional pickup trucks include a tailgate at the back of a bed that closes off a cargo box. Often times, users desire to attach accessory devices to pickup trucks. Typical accessory devices include tables, workbenches, ramps, benches, steps, etc. To secure such accessory devices to a pickup truck, users often make structural modifications to the pickup truck and/or the tailgate. For example, a user may drill holes in a top wall of a tailgate, or may weld or otherwise fasten attachment devices to the tailgate. Such modifications are often expensive, cumbersome, and time-consuming, and in some instances may detrimentally affect the structural integrity of the tailgate.

The above problems and other problems are addressed by this disclosure as summarized below.

SUMMARY

The tailgate described herein addresses the aforementioned disadvantages of the known prior art by providing structural modifications within the main tailgate assembly to permit the mounting of a tailgate accessory internally of the main tailgate assembly on a pickup truck.

A tailgate pivotally mountable to a vehicle includes a tailgate body comprising first and second sidewalls, and a strainer disposed between the first and second sidewalls and extending in a longitudinal orientation. The tailgate further includes a stake pocket disposed between the first and second sidewalls and extending substantially orthogonal to the strainer. The stake pocket includes a channel body that defines an interior channel.

A vehicle includes a tailgate pivotally mountable to the vehicle. The tailgate includes a tailgate body comprising first and second sidewalls, and a strainer disposed between the first and second sidewalls and extending in a longitudinal orientation. The tailgate further includes a stake pocket disposed between the first and second sidewalls and extending substantially orthogonal to the strainer. The stake pocket includes a channel body that defines an interior channel.

A method for assembling a tailgate includes securing a strainer to at least one of a first sidewall and a second sidewall of a tailgate body. The method further includes securing a stake pocket to at least one of the first and second sidewalls. The stake pocket having an interior channel extending substantially orthogonal to the strainer. The method further includes securing a top wall to the tailgate body. The top wall has an aperture that provides access to the interior channel.

DETAILED DESCRIPTION

As required, detailed embodiments of the present invention are disclosed herein; however, it is to be understood that the disclosed embodiments are merely exemplary of the invention that may be embodied in various and alternative forms. For purposes of description herein, the terms "left," "right," "inner," "outer," "side," and "top," and derivatives thereof shall relate to the tailgate as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
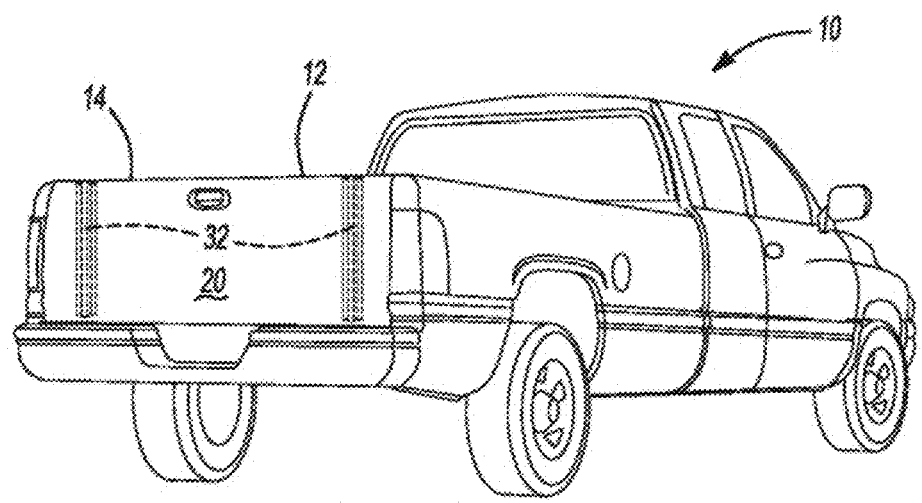
FIG. 1 is a perspective view of a vehicle having a tailgate, with the tailgate shown in a generally vertical, closed position.

FIG. 1 illustrates a vehicle 10 such as a pickup truck that includes a cargo box 12 with a tailgate 14 forming a rear wall of the cargo box 12. The tailgate 14 is secured to the vehicle 10 and is pivotable about a pair of conventional tailgate hinges (not shown) between a generally vertical closed position and a generally horizontal open position.

Figure 2:
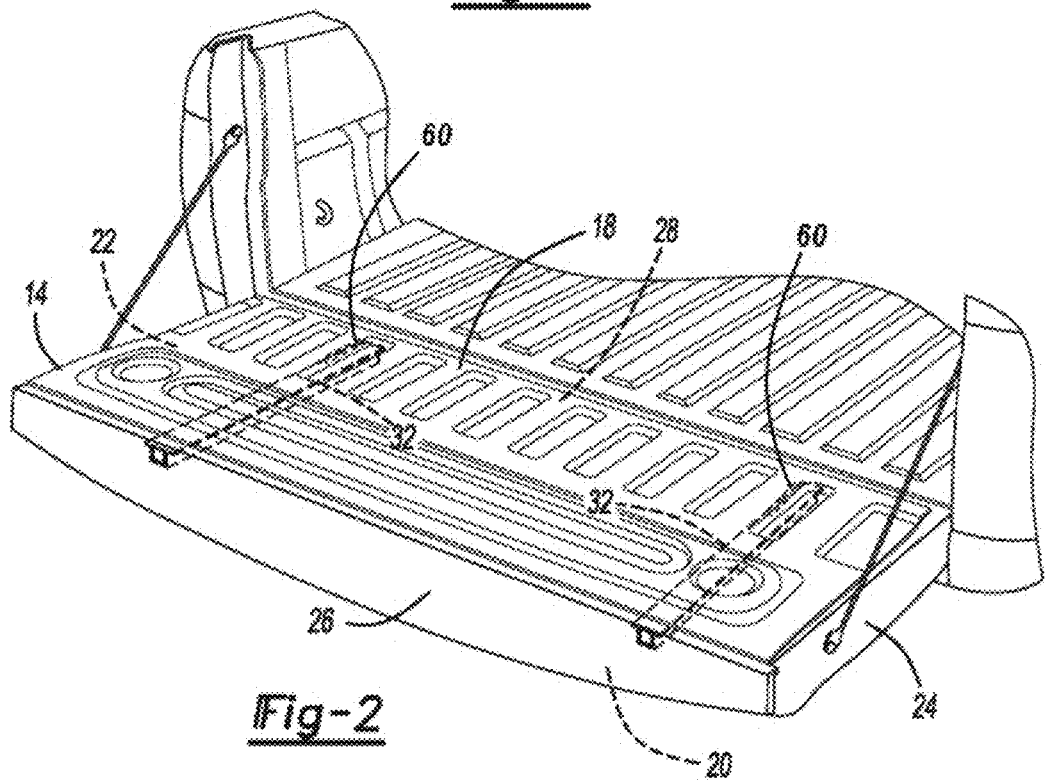
FIG. 2 is a perspective view of the tailgate of FIG. 1, with the tailgate shown in a generally horizontal, open position.

With reference to FIG. 2, the tailgate 14 is comprised of a tailgate frame 16 having an inner panel 18 that forms the inner finished surface of the tailgate 14, an outer panel 20 that forms the outer surface of the tailgate 14, first and second opposing side panels 22, 24 extending between the inner panel 18 and the outer panel 20, a top panel 26, and a bottom panel 28.

Figure 3:
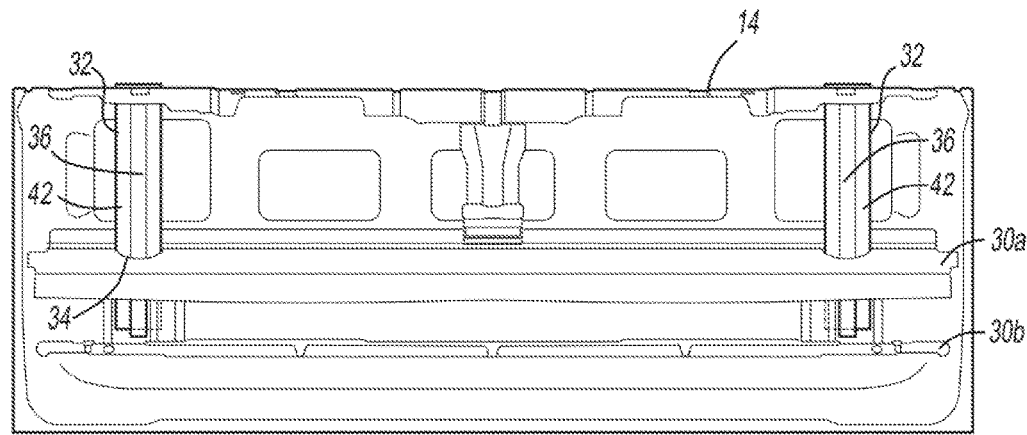
FIG. 3 is a rear elevation view of the tailgate of FIG. 1, shown with the inner and outer panels removed.
Figure 4:
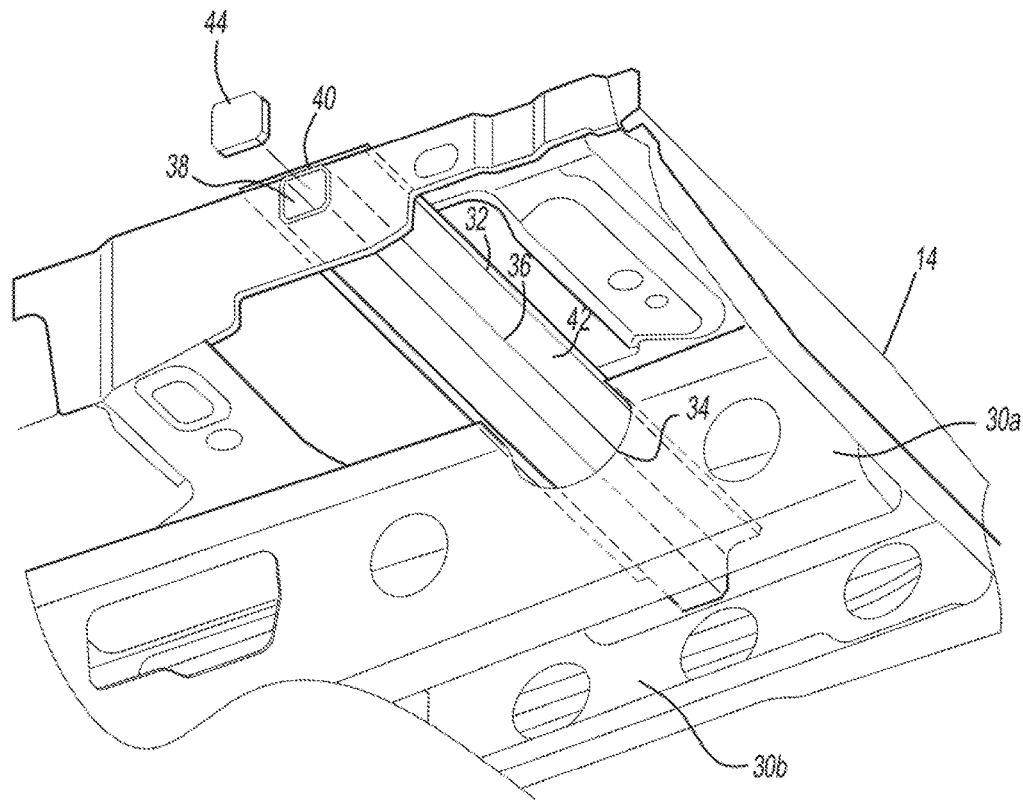
FIG. 4 is a lower perspective view of a portion of the tailgate of FIG. 1, shown with the inner and outer panels removed.

With reference to FIGS. 3 and 4, the tailgate 14 preferably includes longitudinally extending reinforcement members 30a, 30b, commonly referred to as "strainers," disposed between the inner panel 18 and the outer panel 20. The strainers 30a, 30b are preferably welded to the inner panel 18 and may be affixed to the outer panel 20 through fasteners or adhesives. Other approaches for securing the strainers 30a, 30b between the inner panel 18 and the outer panel 20 are possible. Although two strainers 30a, 30b are shown in FIGS. 3 and 4, the tailgate 14 may be provided with only one strainer, with three or more strainers, or with no strainers. Furthermore, other tailgate reinforcement members and/or brackets (not shown) may be mounted within the tailgate frame 16 to provide structural support to the frame inner and outer panels 18, 20.

The tailgate 14 includes transversely extending hollow tubes, also referred to herein as stake pockets 32. Although shown with two stake pockets 32, the tailgate 14 may be provided with only one stake pocket or with three or more stake pockets.

To accommodate the vertical passage of the stake pockets 32 within the tailgate frame 16, the strainers 30a, 30b are formed with gaps or holes 34 to establish a passageway for the reception of the stake pockets 32 therethrough.

In a preferred approach, the stake pockets 32 are formed of extruded aluminum. It is envisioned that the stake pockets 32 may also be formed from other extrudable, lightweight but strong materials as may be known to those skilled in the art. In an extrusion process, aluminum in a malleable state can be "pushed" through a formed shape, such as the shape of the stake pockets 32, and cut or broken to length.

The stake pockets 32 are comprised of a channel body 36 that defines an interior channel 38 having a channel entrance 40. The stake pockets 32 are further comprised of one or more flanges 42 extending from the channel body 36. In a preferred approach, the stake pockets 32 include two flanges 42, with each flange 42 extending continuously along a length of the channel body 36. In other approaches (not shown), the flanges may be discontinuous along a length of the channel body 36.

In one approach, the channel body 36 and the flanges 42 form an integral one-piece stake pocket 32 formed, for example, through an extrusion process. In another approach, the channel body 36 and the flanges 42 are formed as discrete components and subsequently joined through known approaches.

The mounting flanges 42 are preferably planar flanges having flat surfaces that extend from the channel body 36. In this way, the mounting flanges 42 allow for the stake pockets 32 to be secured within the frame of the tailgate 14. In a preferred approach, the stake pockets 32 are secured to an interior wall of the inner panel 18. The stake pockets 32 may be secured to the inner panel 18 through known approaches, such as through welding 60, riveting, bolting, or screwing. As assembled, stake pockets 32 may provide additional reinforcement within the frame of the tailgate 14, thereby improving the structural integrity of the tailgate 14.

The stake pockets 32 are positioned within the framework of the tailgate 14 such that the channel entrance 40 is disposed adjacent the top panel 26 of the tailgate 14. The channel entrance 40 of the stake pockets 32 may be covered by a lid or cap 44 to prevent moisture and other contaminants from entering the interior channel 38. The cap 44 may be mechanically fastened, press-fit, snap-fit, or otherwise secured to a stake pocket 32 at the channel entrance 40. In some approaches, the cap 44 is completely removable from the tailgate 14. In other approaches, at least a portion of the cap 44 is secured to the tailgate 14. For example, an edge of the cap 44 may be hingedly secured to the tailgate 14 such that the cap 44 is capable of being rotated from a closed orientation over the channel entrance 40 to an open orientation to permit access to the channel entrance 40. In this example, the cap 44 may be rotated into the interior channel 38 or away from the interior channel 38 to expose the interior channel 38.

The interior channel 38 of the channel body 36 is adapted to receive an elongated mounting shaft of removable tailgate accessory through the channel entrance 40, as described in greater detail elsewhere herein. In a preferred approach, the channel body 36 defines an interior channel 38 having a square cross-section. In this way, elongated mounting shafts of tailgate accessories are less susceptible to rotation within the interior channel 38. Furthermore, the channel body 36 may be adapted to receive conventionally-sized elongated mounting shafts, such as 1-inch-by-1-inch metal tube structures. Still, in other approaches, the channel body 36 may define other interior channel 38 cross-sections.

The interior channel 38 of the channel body 30 is preferably a hollow, smooth channel free of interior projections. In this way, the interior channel 38 may slidably receive a mounting shaft of a removable tailgate accessory through the channel entrance 40 and along a length of the interior channel 38. In other approaches, the interior channel 38 of the channel body 30 is provided with interior threads to receive a threaded mounting shaft of a tailgate accessory. In such approaches, the channel body 36 may define a circular interior channel 38 cross-section.

As provided, stake pockets 32 of the tailgate 14 may receive elongated mounting shafts of tailgate accessories when the tailgate 14 is disposed in the vertical closed position, as well as when the tailgate 14 is disposed in the horizontal open position.

Figure 5:
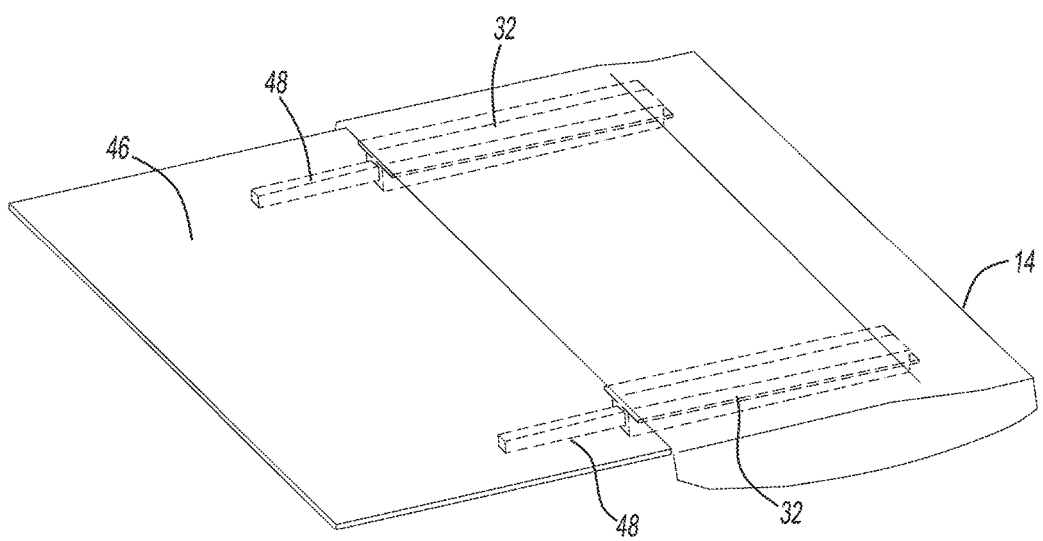
FIG. 5 is an upper perspective view of the tailgate of FIG. 1, shown with an accessory device.
Figure 6:
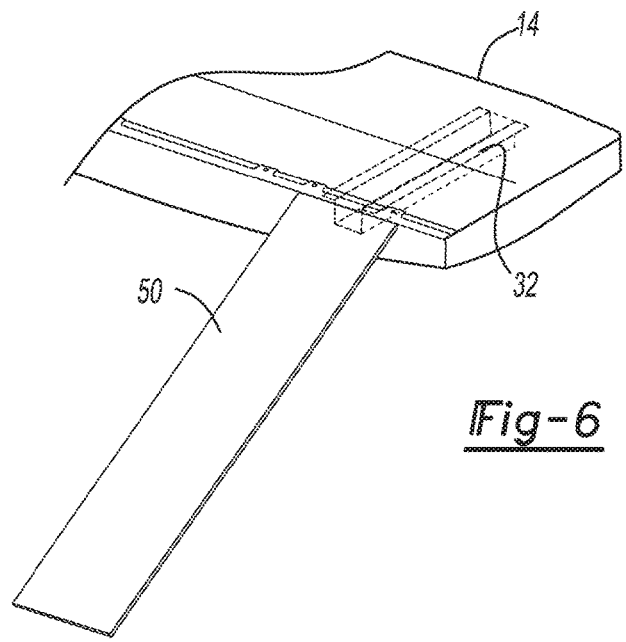
FIG. 6 is an upper perspective view of a portion of the tailgate of FIG. 1, shown with another accessory device.
Figure 7:
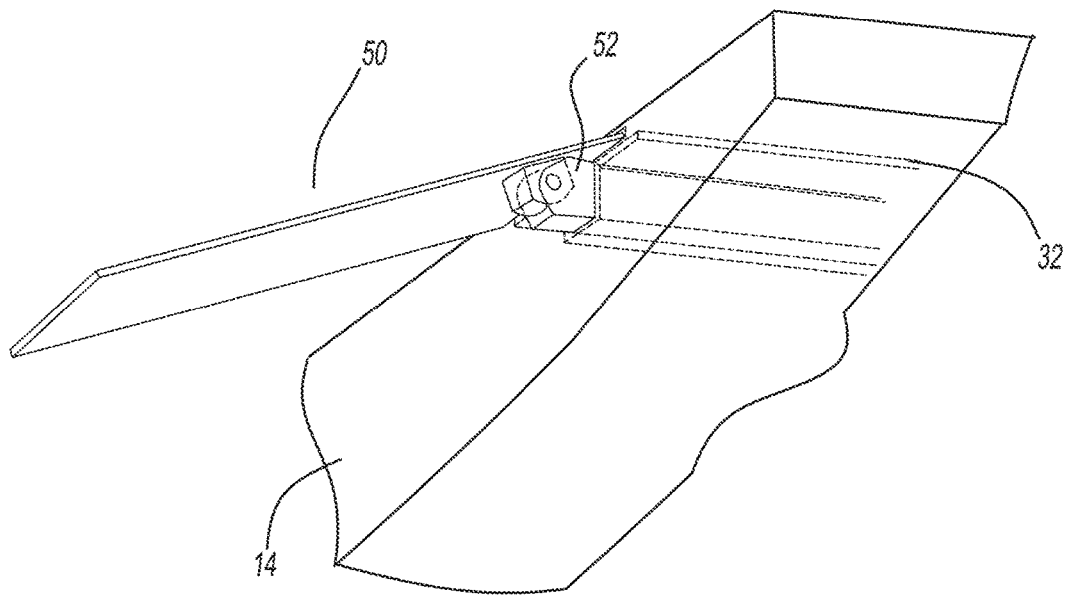
FIG. 7 is a lower perspective view of a portion of the tailgate of FIG. 1, shown with the accessory device of FIG. 6.
Figure 8:
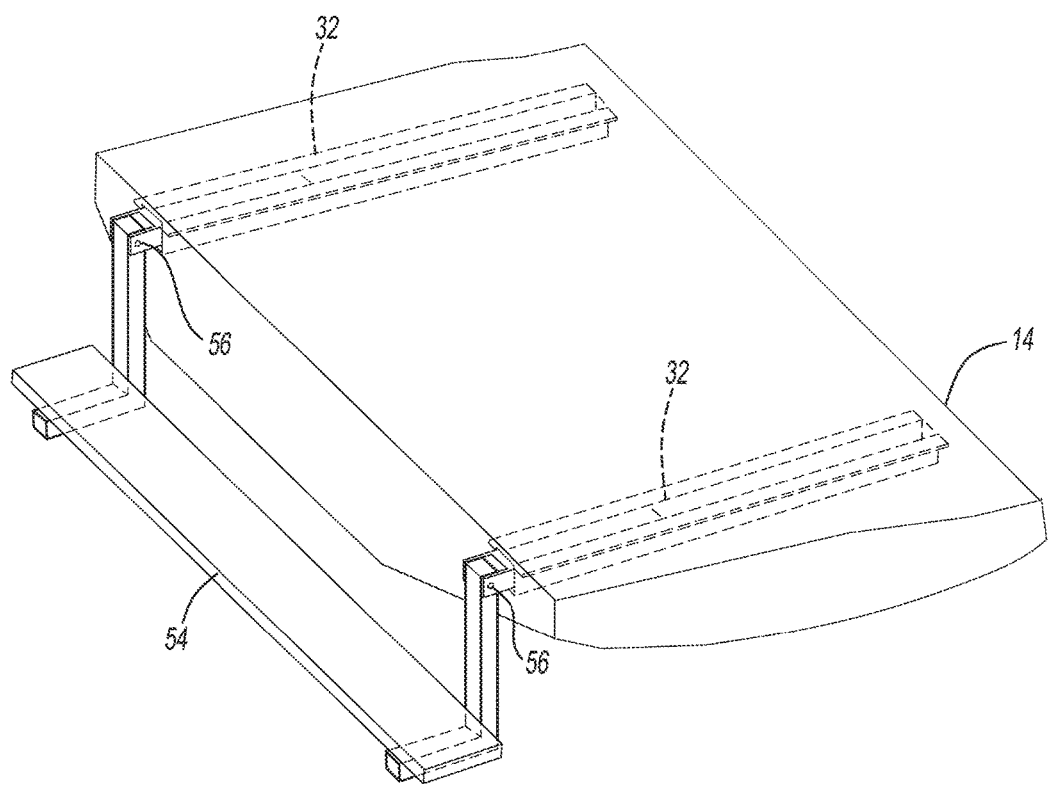
FIG. 8 is an upper perspective view of the tailgate of FIG. 1, shown with yet another accessory device.

With reference now to FIGS. 5-8, stake pockets 32 of the tailgate 14 are adapted to receive elongated mounting shafts of tailgate accessory devices. As shown in FIG. 5, one accessory device is a removable workbench or table accessory 46 having a flat work surface. Mounting shafts 48 of the table 46 are inserted into the two stake pockets 32 to secure the table 46 to the tailgate 14. As shown in FIGS. 6 and 7, another accessory device is a removable ramp accessory 50 having an inclined surface. A mounting shaft 52 of the ramp 50 is inserted into a stake pocket 32 to secure the ramp 50 to the tailgate 14. As shown in FIG. 8, another accessory device is a removable bench or step accessory 54. Mounting shafts 56 of the step 54 are inserted into the two stake pockets 32 to secure the step 54 to the tailgate 14. The elongated mounting shafts 48, 52, 56 of FIGS. 5-8 are mounted to the tailgate 14 such that they may be entirely removed from the stake pockets 32 when not in use.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:
1. A tailgate pivotally mountable to a vehicle comprising:
   a tailgate body comprising inner and outer panels;
   a strainer extending longitudinally between the inner and outer panels; and a stake pocket welded to the inner panel and extending substantially orthogonal to the strainer within the cavity, the stake pocket comprising a channel body defining an interior channel and a flange joined thereto and extending therefrom.

2. The tailgate of claim 1, further comprising:
a stake pocket cap removably connectable to stake pocket at a channel entrance disposed at a terminal end of the channel body to substantially cover the interior channel.

3. The tailgate of claim 2, wherein the stake pocket cap is disposed in press-fit engagement with the stake pocket at the channel entrance.

4. The tailgate of claim 1, wherein the stake pocket is comprised of extruded aluminum.

5. The tailgate of claim 1, wherein the channel body comprises substantially smooth interior sidewalls defining the interior channel.

6. The tailgate of claim 1, wherein the interior channel is a substantially hollow interior channel adapted to slidably receive a removable mounting shaft of an accessory device.

7. The tailgate of claim 1, wherein the stake pocket is a first stake pocket, the tailgate further comprising a second stake pocket, the first and second stake pockets disposed symmetrically about a central axis of the tailgate body.

8. The tailgate of claim 1, wherein the tailgate body further comprises a bottom wall, and wherein the stake pocket is spaced apart from the bottom wall.

9. The tailgate of claim 1, wherein the interior channel of the stake pocket is accessible when the tailgate body is oriented in both an open orientation and a closed orientation.

10. The tailgate of claim 1, wherein the channel body and the flange form an integral one-piece extruded stake pocket.

11. The tailgate of claim 1, wherein the stake pocket includes two opposing flanges joined to, and extending in opposite directions from, the channel body.

12. The tailgate of claim 11, wherein the opposing flanges define a continuous planar surface.

13. The tailgate of claim 11, wherein the opposing flanges extend continuously along the channel body.

* * * * *